J. Brokenshire.

Ship Pump.

No. 3,280. Reissued Feb. 2, 1869.

Witnesses.
Phil. F. Larner.
Geo. W. Rothwell

Inventor.
J. Brokenshire
By Dickerson & Co
Attys.

N. PETERS, PHOTO-LITHOGRAPHER, WASHINGTON, D. C.

United States Patent Office.

JOHN BROKENSHIRE, OF OSWEGO, NEW YORK.

*Letters Patent No.* 80,905, *dated August* 11, 1868; *reissue No.* 3,280, *dated February* 2, 1869.

IMPROVEMENT IN PUMPS.

The Schedule referred to in these Letters Patent and making part of the same.

*To all whom it may concern:*

Be it known that I, JOHN BROKENSHIRE, of Oswego, in the county of Oswego, and State of New York, have invented a new and useful Improvement in Ships' Pumps; and I do hereby declare the following to be a full, clear, and exact desd iption of the same, sufficient to enable others skilled in the art to which my invention appertains, to fully understand and use the same, reference being had to the accompanying drawings, which are made a part of this specification, in which—

Similar letters of reference indicate corresponding parts in the several figures.

The subject of this invention is a double-acting pump, for pumping water from vessels.

The invention consists chiefly in providing a chamber, situated between the barrels, which receives the elevated water at a point somewhat above the lower stationary valves, so that such water, on its way to the exit-nozzle, shall be compelled to descend in said chamber, in such a manner as to produce a vacuum around the suction-pipe in the chamber, and thus aid the plungers in elevating the water.

Figure 1:
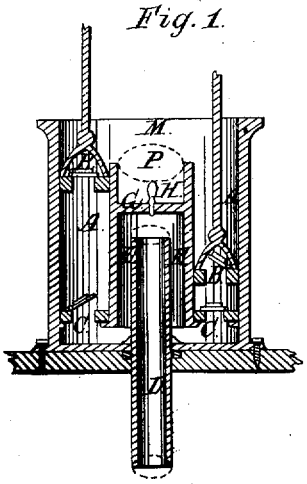
Figure 1 is a vertical central section of a pump, illustrating my invention.
Figure 4:
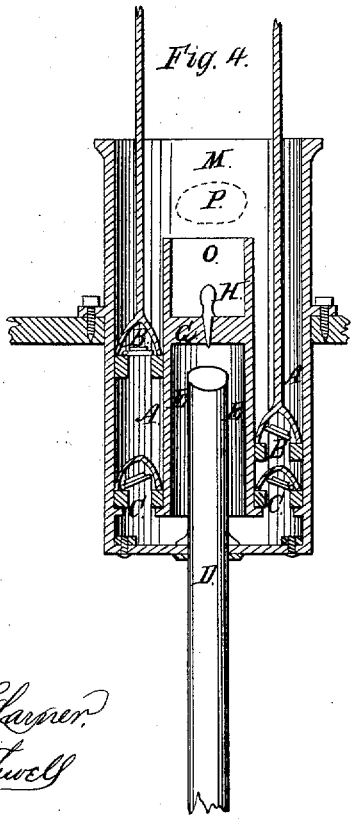
Figure 4 is a vertical sectional view of my pump, as modified to suit deep sea-going vessels.

In figs. 1 and 4,

A A are the pump-barrels;

B B, the plungers bearing the upper valves; and

C C, the lower stationary valves.

D are the suction pipes, and

E E, a chamber, situated centrally between the barrels A A, and into which the suction-pipes lead and discharge.

The suction-pipes communicate with the chamber E, at a point somewhat above the lower valves C C, as clearly shown in figs. 1 and 4.

Figure 2:
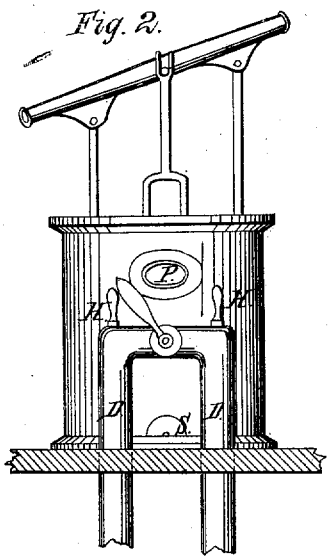
Figures 2 and 3 are modifications thereof.
Figure 3:
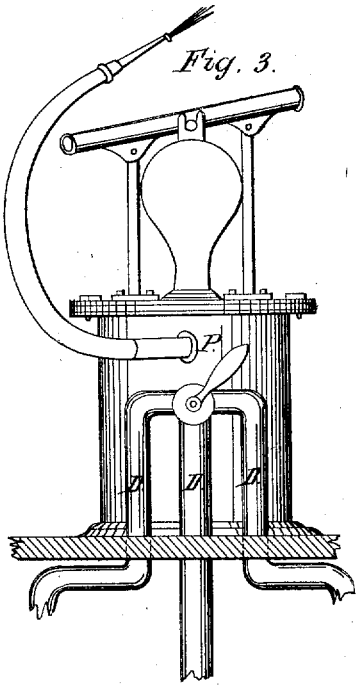

The suction-pipes D may pass up through the deck, and enter the chamber E E vertically, as shown in fig. 1, in which case they are to be secured to the bottom plate of the pump by a screw-joint, or otherwise. But the pipes D, as arranged in fig. 1, may be dispensed with, and a hose or other pipes may be attached to the side of the pump, as shown in figs. 2 and 3, in order to pump, at will, the water from either bilge, from the sides of the vessel, from either side of the kelson, from 'midship, or clean water from the centre-box, for the purpose of washing decks or putting out fire. For this purpose an air-chamber and hose may be attached, as seen in fig. 3.

The suction-pipes, when on the outside, are attached to a suitable turn-cock, or otherwise, which is connected to the pump in any proper manner. These pipes may be attached to the pump, either above or below deck, as the case may be, for the purpose set forth.

To enable the ready attachment and detachment of the hose D, or other pipes, a threaded thimble or thimbles, T, may be inserted in the side of the pump, or any other point suitable for the purpose.

G is a partition, closing or extending across the chamber E E, at a point somewhat above that at which the pipes D communicate with said chamber E.

The chamber E E communicates at bottom with the two pump-barrels, A A.

M is intended to designate the chamber in the upper part of the pump, through which the water passes on its way to the discharge-nozzle P. (See figs. 3 and 5.)

Figure 5:
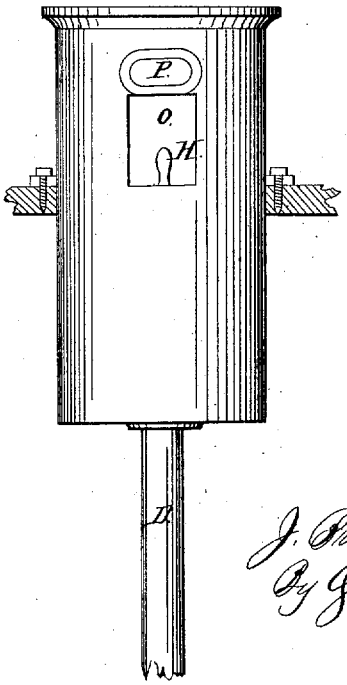
Figure 5 is an elevation of the form shown in fig. 4.

The partition G has an opening, closed by a plug, H, to enable the vessel to be sounded, and when the pump is constructed, as shown in figs. 4 and 5, an opening, O, fig. 5, is formed above deck, between the barrels A A, and beneath the upper chamber or outlet, so as to afford ready access to said plug-opening, which is near the deck.

In fig. 2, *s* represents a plug, closing an opening, through which water is allowed to escape from the pump in winter, to prevent freezing.

It will be observed that the pump shown in figs. 4 and 5 differs from that shown in figs. 1, 2, and 3, merely in that it extends below as well as above the deck.

Before describing the operation of this pump, I will state that when it is of the particular construction indicated in the drawings, it will be preferably of metal, but when made of wood, I first form an opening in the side of the log or piece of timber from which the pump is to be made, and then bore the log longitudinally, so as to form the two barrels, and an ascending duct, or passage, all communicating with said opening in the side, which is to be afterward closed by a cover or plate, so as to form a chamber of communication between the barrels and the suction-pipe.

*Operation.*

This being essentially a suction-pump, the operation, so far as the plungers and valves are concerned, need not be explained.

It will be observed that before the water can pass into the barrels A A, then to be ejected through chamber M and nozzle P, it must be elevated within the chamber E E, above the valves C C, and then descend, in order to pass through said valves. Now, as the chamber E E is closed above the outlet of the pipes D, by the partition G, said chamber forms, in conjunction with the pipes D, a sort of siphon, inasmuch as the water, as it descends in chamber E E, leaves a vacuum above, the effect of which is to cause the pump to be in a measure self-acting, and thus reduce the power required to elevate a given amount of water. Thus the pump may be said to require only the power necessary to discharge its own contents, and the water thus ejected is made available as a means to raise the water from the vessel.

The pump is adapted to hold its own priming, that is to say, to retain the water which it receives, even though the lower valves should be removed from the pump.

The barrels being in communication, a constant discharge may be maintained; and the consequent steady flow of the water prevents the pump from being choked with grain, &c. Choking frequently results from momentary stoppages, or the intermittent action of pumps, as heretofore constructed.

Having thus described my invention,

What I claim as new, and desire to secure by Letters Patent, is—

1. The internal chamber E E, in conjunction with the suction-pipes D, in combination with the barrels A A, plungers B B, and valves C C, substantially as set forth.

2. In combination with the above, the opening and plug in line with the suction-pipes D, as and for the purpose set forth.

To the above specification of my invention, I have signed my name, this 16th day of January, 1869, in the presence of two subscribing witnesses.

JOHN BROKENSHIRE.

Witnesses:

GEO. W. ROTHWELL,
ALFRED GREGORY.